(12) United States Patent
Cai (10) Patent No.: US 10,515,142 B2
(45) Date of Patent: Dec. 24, 2019

(54) METHOD AND APPARATUS FOR EXTRACTING WEBPAGE INFORMATION

(71) Applicant: GUANGZHOU UCWEB COMPUTER TECHNOLOGY CO., LTD, Guangzhou (CN)

(72) Inventor: Ming Cai, Guangzhou (CN)

(73) Assignee: GUANGZHOU UCWEB COMPUTER TECHNOLOGY CO., LTD, Guangzhou (CN)

(*) Notice: Subject to any disclaimer, the term of this patent is extended or adjusted under 35 U.S.C. 154(b) by 0 days.

(21) Appl. No.: 15/183,069

(22) Filed: Jun. 15, 2016

(65) Prior Publication Data

US 2016/0364373 A1 Dec. 15, 2016

(30) Foreign Application Priority Data

Jun. 15, 2015 (CN) .......................... 2015 1 0335008

(51) Int. Cl.
| | | |
|---|---|---|
| *G06F 17/20* | (2006.01) | |
| *G06F 17/22* | (2006.01) | |
| *G06F 17/21* | (2006.01) | |
| *G06F 17/27* | (2006.01) | |
| *H04W 88/02* | (2009.01) | |

(52) U.S. Cl.
CPC ........ *G06F 17/2288* (2013.01); *G06F 17/218* (2013.01); *G06F 17/2247* (2013.01); *G06F 17/272* (2013.01); *G06F 17/277* (2013.01); *H04W 88/02* (2013.01)

(58) Field of Classification Search
CPC .................................................. G06F 17/2247
See application file for complete search history.

(56) References Cited

U.S. PATENT DOCUMENTS

| | | | | |
|---|---|---|---|---|
| 6,122,657 | A * | 9/2000 | Hoffman, Jr. | ........... H04L 29/06 709/201 |
| 7,054,901 | B2 * | 5/2006 | Shafer | ................ G06Q 30/0277 707/999.002 |
| 2007/0050708 | A1 * | 3/2007 | Gupta | ............... G06F 17/30908 715/235 |
| 2008/0201633 | A1 * | 8/2008 | Huang | .................. G06F 17/211 715/239 |
| 2014/0283139 | A1 * | 9/2014 | Anand | .................... G06F 21/54 726/30 |
| 2015/0220490 | A1 * | 8/2015 | Barber | .................. G06F 17/212 715/234 |

FOREIGN PATENT DOCUMENTS

| | | |
|---|---|---|
| CN | 102567530 A | 7/2012 |
| CN | 102955827 A | 3/2013 |
| CN | 103412928 A | 11/2013 |
| CN | 103440315 A | 12/2013 |
| CN | 103544283 A | 1/2014 |

* cited by examiner

*Primary Examiner* — Keith D Bloomquist
(74) *Attorney, Agent, or Firm* — Anova Law Group PLLC (57) ABSTRACT

A method is provided for extracting page information. The method includes obtaining to-be-processed source code of a webpage; based on a preset filtering characteristic string and a preset tag matching mode, extracting target information from the source code; and generating page information in a specified format based on the extracted target information.

21 Claims, 3 Drawing Sheets

METHOD AND APPARATUS FOR EXTRACTING WEBPAGE INFORMATION

CROSS-REFERENCES TO RELATED APPLICATIONS

This application claims the priority of Chinese Patent Application No. 201510335008.8 filed on Jun. 15, 2015, the entire content of which is incorporated herein by reference.

FIELD OF THE DISCLOSURE

The present disclosure generally relates to the field of electronic devices and communications technology and, more particularly, relates to a method and a device for extracting webpage information.

BACKGROUND

Currently, webpages are generally designed for terminals with relatively large screens. Contents of webpages are often rich and have complex structures. However, nowadays, users often browse webpages through mobile terminals with smaller screens. To improve the readability of webpages displayed on a mobile terminal, it is necessary to extract page information from a webpage and display the extracted page information on a mobile terminal.

Currently, related art provides a DOM (document object model) tree-structured webpage information extraction method. The method includes obtaining a webpage and performing a lexical analysis on the webpage to obtain each word contained in the webpage. Each word is parsed to obtain each node included in the webpage. The nodes can form a DOM tree by script analysis. Further, a data recognition algorithm based on DOM is applied to identify the page information, in the DOM tree, that is relevant to the target information, and the identified page information is then displayed.

However, according to the present disclosure, the above technology may have some issues. For example, the DOM tree based webpage information extraction method requires analysis on entire contents of the webpage. The entire contents of the webpage often include a large amount of words and nodes that are irrelevant to the target information. As a result, the webpage information extraction efficiency is low.

The disclosed method and device for extracting webpage information are directed to solve one or more problems set forth above and other problems.

BRIEF SUMMARY OF THE DISCLOSURE

One aspect of the present disclosure provides a method for extracting page information. The method includes obtaining to-be-processed source code of a webpage; based on a preset filtering characteristic string and a preset tag matching mode, extracting target information from the source code; and generating page information in a specified format based on the extracted target information.

Another aspect of the present disclosure provides a page information extracting apparatus. The page information extracting apparatus includes an obtaining module, an extraction module, and a generating module. The obtaining module is configured to obtain to-be-processed source code of a webpage. The extraction module is configured to, based on a preset filtering characteristic string and a preset tag matching mode, extract target information from the source code. Further, the generating module is configured to generate page information in a specified format based on the extracted target information.

Another aspect of the present disclosure provides a non-transitory computer readable memory comprising a computer readable program stored thereon, wherein, when being executed, the computer readable program causes a computer to implement a method for extracting page information. The method includes obtaining to-be-processed source code of a webpage; based on a preset filtering characteristic string and a preset tag matching mode, extracting target information from the source code; and generating page information in a specified format based on the extracted target information.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 4A:
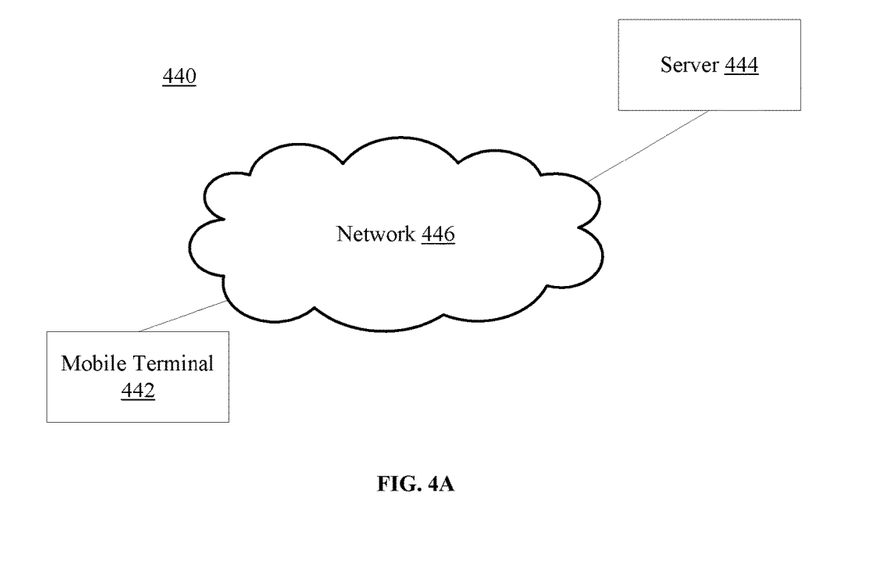
FIG. 4A illustrates an exemplary system incorporating certain aspects of the disclosed embodiments.

FIG. 4A illustrates an exemplary system incorporating certain aspects of the disclosed embodiments. As shown in FIG. 4A, system 440 may include mobile terminal 442, network 446, and server 446. Any number of mobile terminals, networks, servers, and/or other components may also be included.

Mobile terminal 442 may include any user terminal, such as smart phone, tablet, personal digital assistant (PDA), and other portable electronic devices with display functions, etc. Server 444 may include one or more server computer systems for providing various server functions. For example, server 444 may include a web server, and may also include a proxy server for the mobile terminal 442 to access web servers and other servers.

Mobile terminal 442 may communicate with the server 444 via network 446, which may correspond to a local area network (LAN), a wide area network (WAN), a corporate intranet, the public Internet, a wireless or cellular network, or any other type of network configured to provide a communications path between networked computing devices. The network 446 may also correspond to a combination of one or more LANs, WANs, corporate intranets, and/or the public Internet.

Figure 4B:
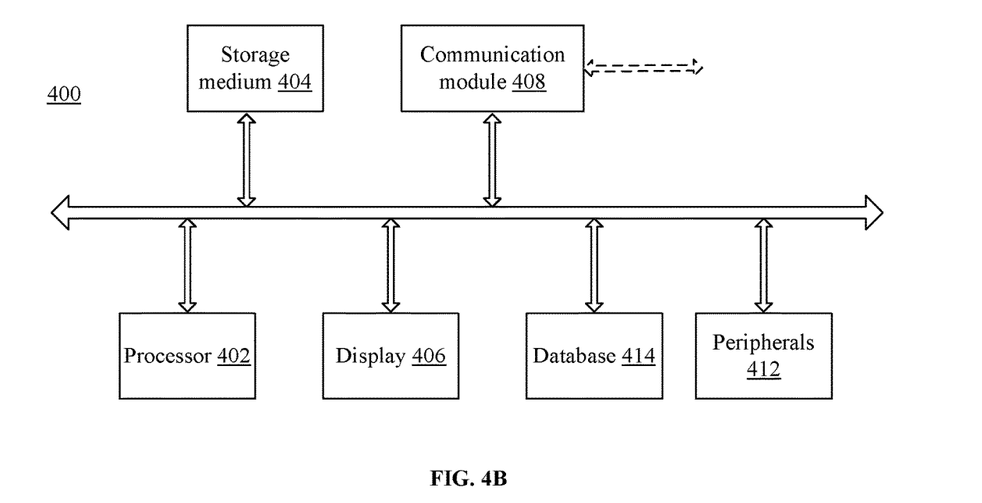
FIG. 4B illustrates an exemplary computing system consistent with various disclosed embodiments.

Mobile terminal 442 and/or server 444 may be implemented on any appropriate computing platform. FIG. 4B illustrates an exemplary computing system 400 consistent with the disclosed embodiments.

As shown in FIG. 4B, the computing system 400 may include a processor 402, a storage medium 404, a display 406, a communication module 408, a database 414, and peripherals 412. Certain devices may be omitted and other devices may be included.

Processor 402 may include any appropriate processor or processors. Further, processor 402 can include multiple cores for multi-thread or parallel processing. Storage medium 404 may include memory modules, such as ROM, RAM, flash memory modules, and mass storages, such as CD-ROM and hard disk, etc. Storage medium 404 may store computer programs for implementing various processes, when the computer programs are executed by processor 402.

Further, peripherals 412 may include various sensors and other I/O devices, such as keyboard and mouse, and communication module 408 may include certain network interface devices for establishing connections through communication networks. Database 414 may include one or more databases for storing certain data and for performing certain operations on the stored data, such as database searching.

During operation, mobile terminal 442 may request contents from server 444. The contents can include, but is not limited to, web pages, hypertext, scripts, binary data such as compiled software, images, audio, and/or video. The contents can include compressed and/or uncompressed content. The content can be encrypted and/or unencrypted. Other types of content are possible as well.

Specifically, a user of the mobile terminal may request a web page via a certain operation on the browser on the mobile terminal. An operation can include, but is not limited to, typing a website address in address bar, clicking on back/forward button, selecting a website in a bookmarking menu, clicking on a link to a website, or the like. The web page can then be downloaded from the server according to a plurality of requests from the browser. In another example, the webpage may be previously stored on the memory of on the electronic device and can be retrieved by the browser.

The source code of the web page can be written in HyperText Markup Language (HTML), or any other programming language that can provide similar functionalities in accordance with various embodiments. For illustrative purposes, in certain embodiments described in the present disclosure, the web page document is an HTML document. HTML documents are made up by HTML elements and various tags.

Figure 1:
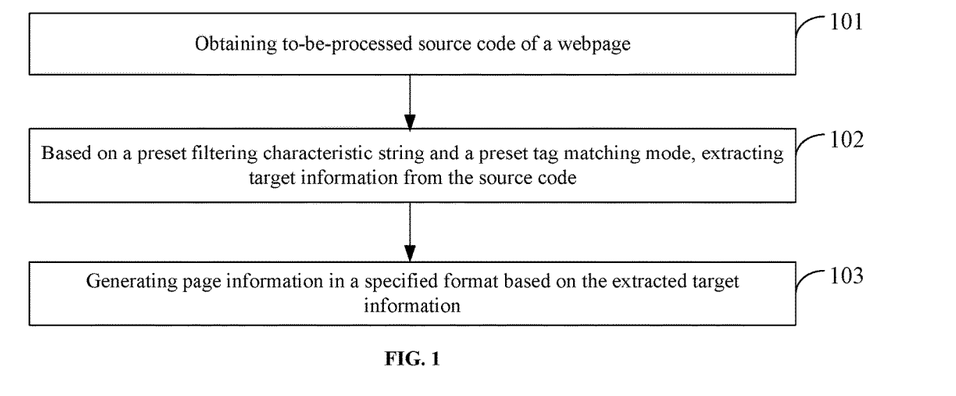
FIG. 1 illustrates a flow chart of an exemplary method for extracting webpage information consistent with various disclosed embodiments.

To properly display the content in HTML on a display screen on the mobile terminal, which is often relatively small, a webpage information extraction process may be performed by the mobile terminal and/or the web server. FIG. 1 illustrates an exemplary process for extracting webpage information. According to the disclosed embodiments, target information may be extracted from the source code of a to-be-processed webpage based on preset filtering character strings and preset tag matching mode. As shown in FIG. 1, the method may include following Steps S101-S103.

Step S101: Obtaining to-be-processed source code of a webpage.

As a mobile terminal in general includes a web browser, a user of a mobile terminal can often browse/access webpages through the browser. The to-be-processed webpage may be one of those webpages that can be opened or downloaded through a browsing request by the browser on the mobile terminal.

In one embodiment, to obtain the to-be-processed source code of a webpage, the mobile terminal may receive a webpage request from the user, and the mobile terminal may send the webpage request to a corresponding web server. The web server that receives the webpage request may send the source code of the webpage requested to the mobile terminal through streaming. The mobile terminal may receive the source code through streaming or other mode of transmission. The received source code may be the to-be-processed source code of the webpage.

The streaming mode may be configured to constantly send the source code of a webpage to a mobile terminal, on a real-time basis, for the corresponding web server. When the mobile terminal receives a portion of the source code, the mobile terminal may process the received portion of the source code, and does not need to wait for the entire source code to be received for processing. By receiving the source code of the webpage through streaming, the mobile terminal may start extracting the webpage information from the received portion of the source code while receiving the remaining portion of the source code. Thus, the efficiency for obtaining webpage information may be improved.

Further, considering the source code of a webpage may be lengthy, depending on actual situations, the mobile terminal may divide the source code of a webpage to a plurality of code segments or selecting/extracting only one or more needed segments from the source code of the webpage to process. Thus, the amount of code data to be processed in a single process may be reduced.

A segmentation characteristic string may be set up in advance to divide the source code into a plurality of source code segments. For example, from the beginning of the source code, the mobile terminal may search for the string that match the segmentation characteristic string according to a certain order, e.g., from the beginning of the source code to the end of the source code. The mobile terminal may divide the source code at the matching string, i.e., the string that matches the segmentation characteristic string, so that the source code of a webpage may be divided into a plurality of code segments.

The mobile terminal may also extract a needed segment from the source code. For example, the mobile terminal may extract or select one or more needed segments from the source code based on a preset starting string and a preset ending string, e.g., the segment between the matching starting character string and ending character string in the source code.

Step S102: Extracting target information from the source code based on a preset filtering characteristic string and a preset tag matching mode.

To extract the target information from the source code, e.g., from a segment or segments of the source code, a lexical analysis may be performed on the source code to obtain every tag information of the source code. The mobile terminal may delete the tag information that matches one or more preset filtering characteristic strings. The mobile terminal may further extract the tag information that match one or more preset tag matching mode as the target information.

A filtering characteristic string may refer to a character string designed for content filtering. For example, a content item containing the filtering characteristic string may be filtered out of the content. A tag matching mode may refer to a specific type or combination of types of tag information for selecting content item(s) included in the target information (e.g., information targeted for display to the user of the mobile terminal).

The lexical analysis may be performed from the beginning of the source code and may sequentially cover each character of the source code. The lexical analysis may be used to convert the analyzed characters to the tag information contained in the source code.

As used herein, the tag information refers to a source code string that constitutes or represents a complete piece of information in a webpage. Taking hyper text markup language (HTML) as an example, the character string <a href="http://tv.UC.com">Video </a> constitutes a hyperlink information, and the character string <img src="/i/eg_tu-.jpg" alt="flower"/> constitute an image information. These source codes are all tag information. Further, a plurality of nested tags may form a more complex information, such as navigation bars, etc., and the source code character string corresponds to such complex information is also a tag information.

For a closed type tag, the tag information includes an opening tag string, a corresponding closing tag string, and all the character strings between the opening tag string and the closing tag string. For a self-closing type tag, which does not form a combination of opening tag and closing tag, its tag information includes all character strings in the tag.

For example, for the hyperlink tag <a>, which is a closed type tag, the tag information includes the opening tag string <a . . . >, the closing tag string </a>, and the all the character strings between the opening tag string <a . . . > and the closing tag string </a>. For instance, for the hyperlink <a href="http://tv.UC.com">Video</a>, its tag information includes strings <a href="http://tv.UC.com">, </a>, and "video."

For another example, for the image tag <img>, which is a self-closing type tag, its tag information includes all the strings within the image tag. For instance, for the image tag <img src="/i/eg_tu.jpg" alt="flower"/>, its tag information includes all the characters of the tag string <img src="/i/eg_tu.jpg" alt="flower"/>.

Further, for all tag information in the source code, the tag information matching the preset filtering characteristic string may be deleted by the following operations.

1) Reading the opening tag string in the tag information. For the closed type tag, the opening tag string is read; while for the self-closing type tag, the entire string in the tag is read as the opening tag string.

2) Determining whether the opening tag string contains any preset filtering characteristic string. When it is determined that the opening tag string contains the preset filtering characteristic string, it is determined that the tag information matches the preset filtering characteristic string, and the tag information needs to be filtered out. The matching tag information is then deleted from the source code.

When it is determined that the tag information does not match the preset filtering characteristic string, it is further determined whether the tag information matches with the preset tag matching mode. If the tag information matches with the preset tag matching mode, the tag information is determined as the target information.

The tag matching mode may be set in advance based on tag types, such as a hyperlink type, a text type, an image type, and a video type, etc. The preset tag matching mode may be a single tag matching mode formed by a single tag type, or may be a composite tag matching mode formed by a combination of multiple tag types.

When a single tag matching mode is set as the tag matching mode, the tag information that is not deleted is sequentially matched in accordance with the single tag matching mode, and the tag information matching the single tag matching mode is extracted as the target information.

When a composite tag matching mode is set as the tag matching mode, the tag information that is not deleted is sequentially matched in accordance with the composite tag matching mode, and the combination of the multiple tag information, arranged in a sequential order, matching with the composite tag matching mode is extracted as the target information.

Thus, in the above tag information filtering and mode matching operations, the opening tag string in the tag information is used. Other suitable strings may also be used.

An opening tag string in the tag information may contain both a string indicating a type of the tag, and a filtering characteristic string. For example, in the following HTML language source code of a web page, the hyperlink tag <a href="http://tv.UC.com">Video </a>, the opening tag string in the tag information is <a href="http://tv.UC.com">. Thus, based on the opening tag string, the type of the tag information can be determined as a hyperlink tag type <a>. Assuming that the preset filtering characteristic string is "tv", it can be determined that the opening tag string in the tag information contains in the filtering characteristic string "tv", and this tag information is determined as the tag information to be filtered, which is further deleted from the source code.

The filtering characteristic strings can be configured by the user according to specific needs. By setting the filtering characteristic strings and/or the tag matching mode, the tag information can be filtered and the target information can be further extracted from the unfiltered tag information.

For the above example, assuming that the preset filtering characteristic string is "tv", and the preset tag matching mode is a composite tag matching mode of (text a), which represents extraction of a text tag information and a hyperlink tag information. The source code includes the following tag information 1-3:

Tag information 1: <a href="http://tv.UC.com">Video </a>

Tag information 2: <P> Live Football </P>

Tag information 3: <a href="http://bbs.UC.com">Forum </a>

The filtering and mode matching operations can be performed as follows.

For tag information 1, because the opening tag string <a href="http://tv.UC.com"> contains the preset filtering characteristic string "tv", the tag information 1 is determined as to-be-filtered tag information, and the tag information 1 is then deleted from the source code.

For tag information 2, because the opening tag string <P> does not contain the preset filtering characteristic string "tv", tag information 2 is not to-be-filtered tag information and is not deleted. For tag information 3, because the opening tag string <a href="http://bbs.UC.com"> also does not contain the preset filtering characteristic string "tv", tag information 3 is not to-be-filtered tag information and is not deleted.

Further, it is determined whether the tag information 2 matches the preset tag matching mode (text a). Because the tag information 2 is a text-type tag, the tag information 2 matches the first term of the tag matching mode (text a). Thus, the tag matching continues to the tag information 3. Because the tag information 3 is a hyperlink type tag <a>, the tag information 3 matches the second term of the preset tag matching mode (text a). Thus, the combination of the tag information 2 and the tag information 3 match the preset tag matching mode (text a), and it can be determined that the tag information 2 and the tag information 3 is the target information to be extracted.

Further, when performing the filtering and tag matching operations on the source code, a single tag may be used as a basic element. That is, a "token" may be used as a unit for operation and determination. Using the HTML language, for example, the format of the token may be as <* . . . >, i.e., a string between '<' and '>'.

For example, a hyperlinks tag <a href="http://tv.UC.com"> video </a> includes two tokens, an opening tag string <a href="http://tv.UC.com">; and a closing tag string </a>. By using tokens as the basic determination elements for the filtering and tag matching operations, it may facilitate lexical analysis, and increase filtering and tag matching efficiency, especially for tag based webpage programming languages, such as the HTML language, etc.

When filtering the source code, for the closed type tags, if the token of the opening tag of the tag information contains the preset filtering characteristic string, the operation enters into a filtering mode. All character strings starting from the token of the opening tag to the token of the closing tag are read. The read-out character strings, together with the token of the opening tag and the token of the closing tag, are filtered, i.e., deleted from the source code.

For self-closing type tags, if the opening tag of the tag information contains the preset filtering characteristic string, the tag information can be directly deleted from the source code. That is, for the self-closing type tags, because all character strings in the tag information are the opening tag string, it is sufficient to just delete the opening tag token.

Further, during the tag matching, the opening tag token can be used to perform the tag matching. If the current opening tag token matches the preset tag matching mode, a next opening tag token is obtained to perform the tag matching, until all tag information is tag matched.

Accordingly, in the above source code processing, the filtering operation is performed first, followed by the tag matching operation. Such approach may be desired for source code in most tag-based webpage programming languages, especially the HTML language, which may have a relatively high extraction efficiency. However, those skilled in the art would understand that the tag matching operation may be performed first, and then followed by the filtering operation. Other approaches may also be used.

Step 103: Generating page information in a specified format based on the extracted target information.

Because the extracted target information based on the preset filtering characteristic string and the preset tag matching mode might not be standard program code, a browser may be unable to directly load and display the page information corresponding to the target information based on extracted target information. Thus, in Step 103, corresponding page display code may be generated first based on the extracted target information, and the page display code may be used by the browser to load and display the page information corresponding to the target information.

The page display code may be program code in the HTML language format. Thus, after the above operations, the browser can load and display the page information corresponding to the target information. Such approach may be suitable for different types of mobile terminals to extract and display page information.

Usually, different mobile terminals may have different page display capabilities, such as different screen sizes. When the screen size of a mobile terminal is small, it may appear crowded even when less page information is displayed. Thus, the preset filtering characteristic strings and the preset tag matching modes may be set based on a combination of parameters such as the model of the mobile terminal, and the screen size and resolution, etc., and the hardware processing capability of the mobile terminal. Using the preset filtering characteristic strings and the preset tag matching modes configured on such information, the extracted page information may be more suitable to be displayed by the corresponding mobile terminal.

When the screen size of the mobile terminal is small, a variety of information needs to be filtered, such that more refined page information can be extracted, and the page information can be more suitable for display on the small screen of the mobile terminal. That is, by setting the filtering characteristic strings, the tag information that is not suitable for small screen mobile terminal can be filtered out. For example, the tag information unsuitable for the small screen mobile terminal may include video-type tag information, image-type tag information, or sub-link type tag information, etc. The strings contained in such tag information unsuitable for the small screen mobile terminal may be set as the filtering characteristic string.

By filtering out the tag information unsuitable for the small screen mobile terminal and keeping the tag information suitable for the small screen mobile terminal, page information suitable for the small screen mobile terminal can be displayed on the small screen mobile terminal, improving user experience on the small screen mobile terminal. On the other hand, when the mobile terminal has a relatively large screen, page information occupying a larger display area and with rich content can be extracted to improve the user experience on such mobile terminal.

Because the operations are performed directly on the strings in the source code of the to-be-processed webpage, the operations are relatively simple, and the page information can be extracted from the webpage without generating a DOM tree. Thus, the extraction efficiency can be increased. Further, the page information extraction can be performed on the mobile terminal, and also can be performed on the web server corresponding to the mobile terminal.

When the page information extraction operations are performed on the server, the data usage of the mobile terminal can be reduced, and the system resource usage of the mobile terminal can also be reduced. Further, because the source code of a webpage is often downloaded from the beginning of the source code, and the above operations can also be performed from the beginning of the source code, such operations can be performed while still downloading the source code of the webpage. That is, the operations can be performed on the already downloaded source code while remaining source code is still being downloaded. Thus, the time for extracting the page information can be reduced, and the efficiency for extracting the page information can be increased.

Accordingly, the disclosed page information extraction method can be executed on a mobile terminal of a user, or on a corresponding web server. That is, when the user browses webpages through the mobile terminal, the mobile terminal can perform the page information extraction operations, and display the extracted page information on the mobile terminal. Alternatively, the web server can perform the page information extraction operations, and the server then sends the extracted page information to the mobile terminal for display.

When the mobile terminal performs the page information extraction operations, the system architecture can be simplified, but the burden on the mobile terminal may be increased, costing resources on the mobile terminal. When the server performs the page information extraction operations, the system architecture may be complex, but resources on the mobile terminal may be saved, improving user experience.

Thus, according to the disclosed embodiments, based on the preset filtering characteristic strings and the preset tag matching mode, target information can be extracted from the source code. Based on the extracted target information, page information in specified format can be generated. Because the target information is extracted based on the preset filtering characteristic strings and the preset tag matching mode, the page information unsuitable for display on small screen mobile terminals can be filtered, avoiding the extraction of all contents of the to-be-processed webpages through the DOM tree. Thus, the efficiency for extracting the page information can be increased, and different types of mobile terminals can all use such methods to extract and display the page information.

Figure 2A:
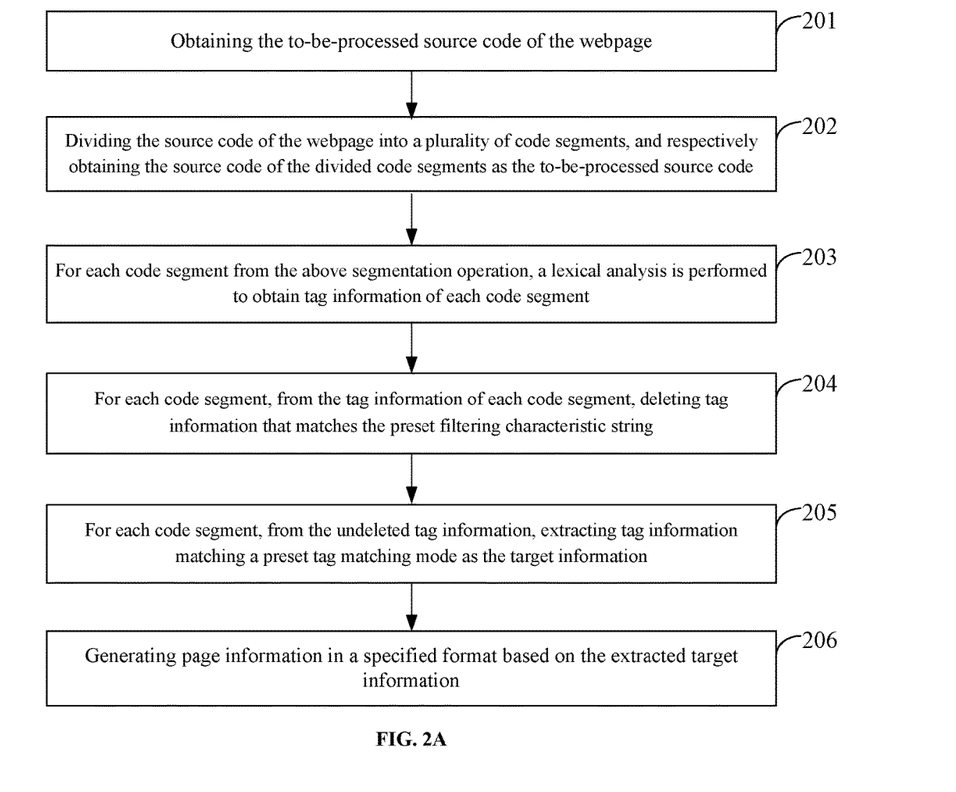
FIG. 2A illustrates a flow chart of another exemplary method for extracting webpage information consistent with various disclosed embodiments.

FIG. 2A illustrates another exemplary process for extracting page information, which may be implemented on a mobile terminal or a corresponding web server. According to the disclosed page information extraction process, the source code of a to-be-processed webpage are segmented into a plurality of code segments first. Then, based on preset filtering characteristic strings and preset tag matching modes, target information can be extracted respectively from the plurality of code segments. Referring to FIG. 2A, the extraction process may include the following steps.

Step 201: Obtaining the to-be-processed source code of the webpage.

When the extraction process is performed by the mobile terminal, the user of the mobile terminal browses the webpage through the mobile terminal, and the mobile terminal may send the webpage request to a corresponding web server. The webpage request may contain a link to the webpage. The web server that receives the webpage request and, based on the link to the webpage, may send the source code of the webpage requested to the mobile terminal through. The mobile terminal may receive the source code, extract page information from the source code, and display the extracted page information.

When the extraction process is performed by a proxy server, the user of the mobile terminal browses the webpage through the mobile terminal, and the mobile terminal may sends the webpage request to the proxy server. After receiving the webpage request, the proxy server sends the webpage request to a corresponding web server. The proxy server then receives from the web server the source code of the webpage returned by the web server. The proxy server then performs the extraction process on the received source code, extract page information from the source code, and sends back the extracted page information to the mobile terminal for display. To improve the page information extraction efficiency, the received source code can be processed while remaining source code is still being obtained, and the source code can be obtained through streaming.

Specifically, Step 201 may include: receiving the user's webpage request, sending the user's webpage request to the corresponding web server; receiving from the web server the source code of the web page by streaming, and using the currently received streamed source code as the to-be-processed source code of the webpage.

The streaming mode may be configured to constantly send the source code of a webpage to a mobile terminal, on a real-time basis, for the corresponding web server. When the mobile terminal receives a portion of the source code, the mobile terminal may process the received portion of the source code, and does not need to wait for the entire source code to be received for processing. By receiving the source code of the webpage through streaming, the mobile terminal may start extracting the webpage information from the received portion of the source code while receiving the remaining portion of the source code. Thus, the efficiency for obtaining webpage information may be improved.

After obtaining the source code of the webpage through the operation of Step 201, operations in the following Steps 202-204 can be performed to extract target information from the source code of the webpage.

Step 202: Dividing the source code of the webpage into a plurality of code segments, and respectively obtaining the source code of the divided code segments as the to-be-processed source code.

Because the source code of a webpage may include many lines of code and lengthy. If extracting the page information directly from the entire source code of the webpage, it might take a long time. To shorten the time to extract page information, improving the extraction efficiency of the page information, the source code of the entire webpage can be first divided into a plurality of code segments. Then code segments can be simultaneously processed, and the page information of the plurality of code segments can be extracted simultaneously from the plurality of code segments to improve the extraction efficiency.

The source code of the webpage is often written in HTML language. The HTML language source code may contain many HTML tags, such as the partition tag <div>, the list tag <ul>, and list item tag <li>, and the like. Certain character string in the HTML tags may be set in advance as the preset segmentation characteristic string. For example, the opening tag string <div id="nav"> in the partition tag <div> may be set as the preset segmentation characteristic string, and the preset segmentation characteristic string <div id="nav"> can then be used to divide the source code the webpage into code segments. The source code in each code segment can then be obtained as the to-be-processed source code.

For example, starting from the beginning of the source code of the webpage, sequentially searching any string in the source code that matches the preset segmentation characteristic string. When a matching string is found, the source code is divided at location of the matching source code.

For example, for the following source code of the webpage:

```
<div id = "nav">
<a href="http://tv.UC.com"> Video </a>
```

```
         </div>
         <div id = "nav">
         <img src = "/ i / eg_tu.jpg" alt = "flower" />
         </div>
```

Based on the preset segmentation characteristic string <div id="nav">, starting from the beginning of the source code of the webpage, sequentially searching any string in the source code that matches the preset segmentation characteristic string <div id="nav">. The matching string can be found, and the source code is divided into two code segments, respectively, <div id="nav"><a href="http://tv.UC.com"> video </a></div> and <div id="nav"><img src="/i/eg_tu.jpg" alt="flower"/></div>.

Accordingly, the size of the code segments can be controlled by the preset segmentation characteristic string. The smaller the code segments, the higher the extraction efficiency for subsequent extracting page information from the code segments simultaneously. Further, because there often exist nesting relationship among HTML tags, the nesting relationship among HTML tags can also be used to control the size of the code segments.

For example, the partition tag <div> can include one or more list tags <ul>, and the list tag <ul> in turn can contain one or more list item tags <li>, etc. Among the partition tag <div>, the list tag <ul>, and the list item tag <li>, when the preset segmentation characteristic string is a string in the partition tag <div>, the size of the divided code segments is the largest; when the preset segmentation characteristic string is a string in the list tags <ul>, the size of the divided code segments is the second largest; when the preset segmentation characteristic string is a string in the list item tag <li>, the size of the divided code segments is the smallest.

The HTML tags may be closed type tags or self-closing type tags. For a closed type tag, the tag information includes an opening tag string, a corresponding closing tag string, and all the character strings between the opening tag string and the closing tag string. For a self-closing type tag, which does not form a combination of opening tag and closing tag, its tag information includes all character strings in the tag.

For example, in the closed type tag <div id="nav"> Weather Forecast </div>, the opening tag string is <div id="nav">, the corresponding closing tag string is </div>. The tag information of the self-closing type tag <img src="/i/eg_tu.jpg" alt="flower"/> is the entire string in the tag.

Further, in addition to dividing the source code of the webpage into the code segments based on the preset segmentation characteristic string, the source code can also be divided based on a preset starting string and a preset ending string, e.g., the segment between the matching starting character string and ending character string in the source code.

The preset starting string and ending string may be set as the opening tag string and the closing tag string of a closed type tag information, respectively.

For example, provided that the preset starting string is set to <div id="nav"> and the ending string is set to </div>, for the following webpage source code:

```
         <div id = "nav">
         <a href="http://tv.UC.com"> Video </a>
         </div>
         <div id = "nav">
         <img src = "/ i / eg_tu.jpg" alt = "flower" />
         </div>
```

According to preset starting string <div id="nav"> and the ending string </div>, the source code can be divided into two code segments, respectively, <div id="nav"><a href="http://tv.UC.com"> video </a></div> and <div id="nav"><img src="/i/eg_tu.jpg" alt="flower"/></div>.

After the source code is divided into a plurality of code segments, operations in the following Steps 203-205 can be performed to extract target information from each code segment separately.

Step 203: For each code segment from the above segmentation operation, a lexical analysis is performed to obtain tag information of each code segment.

For each code segment obtained from the segmentation operation, the lexical analysis may be performed from the beginning of the code segment and may sequentially cover each character of the code segment. The lexical analysis may be used to convert the analyzed characters to the tag information contained in the code segment.

Step 204: For each code segment, from the tag information of each code segment, deleting tag information that matches the preset filtering characteristic string.

The preset filtering characteristic string may be set based on mobile terminal information, which may include one or more parameters such as the model of the mobile terminal, and the screen size and resolution, etc., and the hardware processing capability of the mobile terminal. That is, the user's mobile terminal information is obtained first, based on which the preset filtering characteristic string can then be set.

Usually, different mobile terminals may have different page display capabilities, such as different screen sizes. When the screen size of a mobile terminal is small, it may appear crowded even when less page information is displayed. By setting the filtering characteristic string based on the user's mobile terminal model, display screen parameters, and hardware processing capability, the tag information that is not suitable for small screen mobile terminals, such as video-type tag information, image-type tag information, or sub-link type tag information, etc., can be filtered out based on the preset filtering characteristic string. Thus, more defined page information can be extracted, which can be more suitable for display on the small screen of the mobile terminal, improving user experience when browsing webpages.

More specifically, deleting tag information that matches the preset filtering characteristic string may be achieved by the following operations.

From the beginning of the code segment, obtaining the first tag information from the code segment; reading out the opening tag string and comparing the open tag string with preset filtering characteristic string; and determining whether the opening tag string contains the preset filtering characteristic string. If it is determined that the opening tag string contains the preset filtering characteristic string, it can be further determined that the tag information matches the preset filtering characteristic string, and the tag information is deleted from the code segment. On the other hand, if it is determined that the opening tag string does not contain the preset filtering characteristic string, it can be further determined that the tag information does not match the preset filtering characteristic string, and the tag information is kept.

After the first tag information is processed in the above-described manner, the next tag information from the code segment is obtained and processed in the same way as the first tag information, until all tag information in the code segment is processed. Similarly, other code segments may also be processed to delete tag information matching the preset filtering characteristic string.

Through this step, tag information that is unsuitable for the small screen mobile terminal can be removed, leaving the tag information suitable for the small screen mobile terminal. Thus, it may ensure that the final extracted page information is suitable for display on the small screen mobile terminal, and the page information can be more reasonably displayed on the screen of the mobile terminal, improving the user experience on browsing webpages through the mobile terminal. For example, the preset filtering characteristic string can be set as the submenu "class=childmenu". As a result, the tag information in the code segment corresponding to the sub-menu can be deleted, leaving only the tag information corresponding to the main menu.

The preset filtering characteristic string may be set in advance. For example, the user may set the preset filtering characteristic string using the web browser on the mobile terminal. That is, the browser on the mobile terminal may be configured with selection buttons corresponding to various strings need to be filtered. The user can click on the selection button corresponding to the string to be filtered to set the selected string as the preset filtering characteristic string. The mobile terminal detects the user's click on the selection button, and selects the character string corresponding to the selected button to be set as the preset filtering characteristic string.

Step 205: For each code segment, from the undeleted tag information, extracting tag information matching a preset tag matching mode as the target information.

Different tag information may have different types of tags. Tag types may include hyperlink tag type, text tag type, image tag type, and video tag type, etc. The opening tag string of the tag information may contain characters indicating the tag type of the tag information. The preset tag matching mode may be set based on the tag types. The preset tag matching mode may be a single tag matching mode formed by a single tag type, or may be a composite tag matching mode formed by a combination of multiple tag types.

The preset tag matching mode may be set based on mobile terminal information, which may include one or more parameters such as the model of the mobile terminal, and the screen size and resolution, etc., and the hardware processing capability of the mobile terminal. Thus, based on the mobile terminal information, information not suitable for display on the user's mobile terminal can be determined, and the tag type corresponding to such information can be avoided when setting the tag matching mode.

For example, the tag types may include a hyperlink type, a text type, and an image type. Because, in the HTML programming language, the hyperlink tag is <a>, the text tag is <text>, and the image tag is <img>, the hyperlink type, the text type, and the image type can be respectively represented as a, text, and img. Further, a set of hyperlinks, a set of text, and a set of images can be respectively represented by alist, textlist, and imglist. Thus, the preset tag matching mode for extracting the target information can be a single matching mode from any of the six strings: a, text, img, alist, textlist, and imglist, or can be a composite matching mode from two or more of the six strings, such as (text alist) or (text img alist), etc. The notion (text alist) indicates to sequentially extract a text tag information and a set of hyperlinks tag information, and (text img alist) indicates to sequentially extract a text tag information, an image tag information, and a set of hyperlinks tag information.

When the preset tag matching mode is a single tag matching mode, extracting tag information matching the preset tag matching mode as the target information may be achieved by the following operations: from the undeleted tag information, sequentially tag matching the undeleted tag information with the preset single tag matching mode, and extracting tag information matching the preset single tag matching mode as the target information.

For example, for a single match mode (alist), the undeleted tag information includes the followings:

```
<a href="/"> Live Home </a>
<a href="http://bbs.cc/"> live forum </a>
<img src = "/i/eg_tu.jpg" alt = "flower" />
```

According to the single matching mode (alist), when sequentially tag matching the above tag information, the tag information <a href="/"> Live Home </a>, and the next tag information <a href="http://bbs.cc/"> live Forum </a> form a set of hyperlinks, matching the single tag matching mode alist. Further, the tag information <img src="/i/eg_tu.jpg" alt="flower"/> is not a hyperlink, and does not match the preset single tag matching mode. Thus, the tag information <a href="/"> live Home </a>, and the tag information <a href="http://bbs.cc/"> live forum </a> is extracted as the target information.

When the preset tag matching mode is a composite tag matching mode, extracting tag information matching the preset tag matching mode as the target information may be achieved by the following operations: from the undeleted tag information, sequentially tag matching the undeleted tag information with the preset composite tag matching mode, and extracting a group of tag information matching the preset composite tag matching mode as the target information.

For example, for a composite tag matching mode (alist img), the undeleted tag information includes the followings:

```
<a href="/"> Live Home </a>
<a href="http://bbs.cc/"> live forum </a>
<img src = "/i/eg_tu.jpg" alt = "flower"/>
<text> World Football League </ text>
```

According to the composite matching mode (alist img), when sequentially tag matching the above tag information, the tag information <a href="/"> Live Home </a>, and the tag information <a href="http://bbs.cc/"> live Forum </a> are hyperlinks, matching the first item of the composite tag matching mode (alist img). Further, the tag information <img src="/i/eg_tu.jpg" alt="flower"/> is image type, matching the second item of the composite tag matching mode (alist img). The tag information <text> World football League </text> is text type, and does not match any of the composite tag matching mode (alist img). Thus, the matching tag information, <a href="/"> live Home </a>, <a href="http://bbs.cc/"> live forum </a>, and <img src="/i/eg_tu.jpg"alt="flower"/>, is extracted as the target information.

Further, when the preset tag matching mode includes a set of tags, the tag matching can be consecutive or non-consecutive matching. The consecutive matching is to sequentially tag match the tag information one by one, and stops when a tag information does not match. The non-consecutive matching is to match all tag information to find matching tag information matching the preset tag matching mode without considering the continuousness between the matched tag information. Thus, the preset tag matching mode may include a matching parameter to be set as consecutive or non-consecutive match.

For example, the preset tag matching mode can be (img alist x), where x identifies the preset match parameter of consecutive matches, for the following tag information:

```
<img src = "/ i / eg_tu.jpg" alt = "flower" />
<a href="/"> Live Home </a>
<text> World Football League </ text>
<a href="http://bbs.cc/"> live forum </a>
```

The tag matching result is that the image tag <img src="/i/eg_tu.jpg" alt="flower"/> and hyperlink tag <a href="/"> Live Home </a> are extracted as the target information.

For another example, the preset tag matching mode can be (img alist y), where y identifies the preset match parameter of non-consecutive matches, for the following tag information:

```
<img src ="/i/eg_tu.jpg" alt="flower"/>
<a href="/"> Live Home </a>
<text> World Football League </ text>
<a href="http://bbs.cc/"> live forum </a>
```

The tag matching result is that the image tag <img src="/i/eg_tu.jpg" alt="flower"/>, the hyperlink <a href="/"> Live Home </a>, and the non-consecutive hyperlink <a href="http://bbs.cc/"> live Forum </a> are extracted as the target information.

Further, for every code segment, the above operation can also be performed to extract the target information from every other code segment.

After the target information is extracted according to the above Steps 201-205, page information in a specified format can be generated by the following Step 206.

Step 206: Generating page information in a specified format based on the extracted target information.

Because the extracted the target information based on the preset filtering characteristic string and the preset tag matching mode might not be standard program code, a browser may be unable to directly load and display the page information corresponding to the target information based on extracted target information. Thus, corresponding page display code may be generated first based on the extracted target information, and the page display code may be used by the browser to load and display the page information corresponding to the target information.

The page display code may be program code in the HTML language format.

Thus, after the above operations, the browser can load and display the page information corresponding to the target information. Such approach may be suitable for different types of mobile terminals to extract and display page information.

Figure 2B:
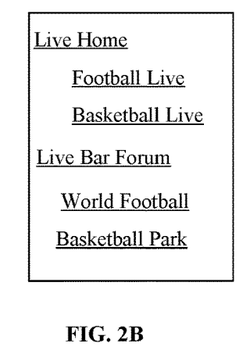
FIG. 2B illustrates an exemplary to-be-processed webpage consistent with various disclosed embodiments.
Figure 2C:
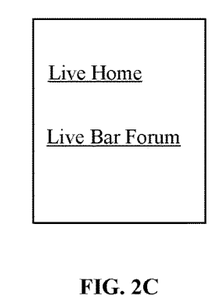
FIG. 2C illustrates exemplary extracted webpage information displayed on a mobile terminal consistent with various disclosed embodiments.

For example, as shown in FIG. 2B, the web page includes two main menus "Live Home" and "Live Bar Forum". The main menu "TV Home" further includes two sub-menus "Football Live" and "Basketball Live", and the main menu "live bar Forum" further includes two sub-menus "World Football" and "Basketball Park". All the main menus and sub-menus are hyperlinks. The filtering characteristic string is the sub-menu "class=childmenu", and the preset tag matching mode is (alist), a set of hyperlinks. The resulting page information for display on the mobile terminal is shown in FIG. 2C.

Accordingly, in the disclosed page information extraction methods, because the operations are performed directly on the strings in the source code of the to-be-processed webpage, the operations are relatively simple, and the page information can be extracted from the webpage without generating a DOM tree. Further, the page information extraction can be performed on the mobile terminal, and also can be performed on the server corresponding to browser on the mobile terminal. When the page information extraction operations are performed on the server, the data usage of the mobile terminal can be reduced, and the system resource usage of the mobile terminal can also be reduced. Further, because the source code of a webpage is often downloaded from the beginning of the source code, and the above operations can also be performed from the beginning of the source code, such operations can be performed while still downloading the source code of the webpage. That is, the operations can be performed on the already downloaded source code while remaining source code is still being downloaded. Thus, the time for extracting the page information can be reduced, and the efficiency for extracting the page information can be increased.

Thus, according to the disclosed embodiments, the source code of the webpage is divided into code segments first. Then, based on the preset filtering characteristic strings and the preset tag matching mode, target information can be extracted from the source code in the code segments simultaneously. Based on the extracted target information, page information in specified format can be generated. Because the source code is segmented, and the target information is extracted from the code segments simultaneously based on the preset filtering characteristic strings and the preset tag matching mode, the time for extracting page information of the webpage can be reduced, the page information extraction efficiency can be increased, and the page information unsuitable for display on small screen mobile terminals can be filtered, avoiding the extraction of all contents of the to-be-processed webpages through the DOM tree. Thus, such disclosed methods may be applied to various types of mobile terminals for extracting and displaying the page information.

Figure 3A:
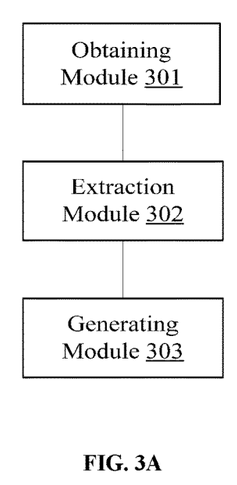
FIG. 3A illustrates an exemplary webpage information extracting apparatus consistent with various disclosed embodiments.

FIG. 3A illustrates an exemplary page information extraction apparatus, which implements the above disclosed page information extraction methods. As shown in FIG. 3A, the page information apparatus includes an obtaining module 301, an extraction module 302, and a generating module 303. Other modules may also be included.

Obtaining module 301 is configured to obtain the source code of a to-be-processed webpage. The to-be-processed webpage may be one of those webpages that can be opened or downloaded through a browsing request by the browser on the mobile terminal.

Figure 3B:
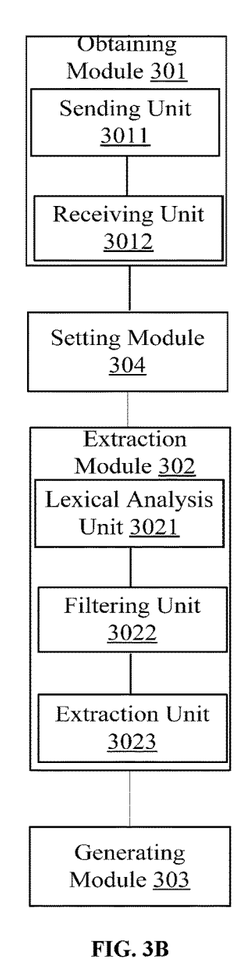
FIG. 3B illustrates another exemplary webpage information extracting apparatus consistent with various disclosed embodiments.

As shown in FIG. 3B, the obtaining module 301 may include certain functional units for obtaining the source code. Specifically, the obtaining module 301 may include a sending unit 3011 and a receiving unit 3012. The sending unit 3011 may be configured to receive a webpage request from the user and to send the webpage request to a corresponding web server. The receiving unit 3012 is configured to the source code returned from the web server through streaming. The received source code by streaming may be the source code of the to-be-processed webpage.

The streaming mode may be configured to constantly send the source code of a webpage to a mobile terminal, on a real-time basis, for the corresponding web server. When the mobile terminal receives a portion of the source code, the mobile terminal may process the received portion of the source code, and does not need to wait for the entire source code to be received for processing. By receiving the source code of the webpage through streaming, the mobile terminal may start extracting the webpage information from the received portion of the source code while receiving the remaining portion of the source code. Thus, the efficiency for obtaining webpage information may be improved.

The extraction module 302 is configured to extract target information from the source code based on a preset filtering characteristic string and a preset tag matching mode.

As shown in FIG. 3B, the extraction module 302 may include certain functional units for extracting the target information. Specifically, the extraction module 302 may include a lexical analysis unit 3021, a filtering unit 3022, and an extraction unit 3023. Other units may also be included.

Lexical analysis unit 3021 may be configured to perform lexical analysis to obtain every tag information from the source code. The lexical analysis unit 3021 may perform lexical analysis from the beginning of the source code and may sequentially cover each character of the source code. The lexical analysis may be used to convert the analyzed characters to the tag information contained in the source code.

The filtering unit 3022 is configured to, from every tag information, delete the tag information matching the preset filtering characteristic string. For every tag information in the source code, the filtering unit 3022 may include certain sub-units to delete the tag information matching the preset filtering characteristic string.

Specifically, the filtering unit 3022 may include a read sub-unit configured to read the opening tag string in the tag information; and a determining sub-unit configured to determine whether the opening tag string contains any preset filtering characteristic string. The filtering unit 3022 may include a deleting sub-unit configured to, when it is determined that the opening tag string contains the preset filtering characteristic string, determine that the tag information matches the preset filtering characteristic string and to delete the tag information from the source code. Further, the extraction unit 3023 is configured to, from undeleted tag information, extract the tag information matches with the preset tag matching mode as the target information.

When the preset tag matching mode is a single tag matching mode, the extraction unit 3023 may include a first mode matching sub-unit configured to tag match the undeleted tag information based on the preset single tag matching mode; and a first extraction sub-unit configured to extract tag information matching the single tag matching mode as the target information.

When the preset tag matching mode is a composite tag matching mode, the extraction unit 3023 may include a second mode matching sub-unit configured to tag match the undeleted tag information based on the preset composite tag matching mode; and a second extraction sub-unit configured to extract multiple tag information sequentially arranged and matching the combination tag matching mode as the target information.

Those skilled in the art can understand that the above-described first mode matching sub-unit and the second mode matching sub-unit may be designed as the same sub-unit, or as different sub-units. Similarly, the above-described first extraction sub-unit and the second extraction sub-unit can be designed as the same sub-unit, or as different sub-units, based on the specific needs.

After the tag information in the source code is processed, the filtering unit 3022 and the extraction unit 3023 can obtain a first tag information from the source code for processing, until all tag information in the source code is completely processed, i.e., all tag information are filtered and the target information is extracted.

Additionally, the obtaining module 301 may also be configured to divide the source code of the webpage into a plurality of code segments based on segmentation characteristic string, and to respectively obtain the source code of the divided code segments as the to-be-processed source code. Correspondingly, the extraction module 302 may also be configured to extract page information of the plurality of code segments can be extracted simultaneously from the plurality of code segments based on the preset filtering characteristic string and the preset tag matching mode.

For code segmentation, the obtaining module 301 may also be configured to divide the source code into at least one code segment based on a preset starting string and a preset ending string, e.g., the segment between the matching starting character string and ending character string in the source code. Correspondingly, the extraction module 302 may also be configured to extract page information from each code segment based on the preset filtering characteristic string and the preset tag matching mode.

Accordingly, because the source code is divided into a plurality of code segments, target information can be extracted from multiple code segments simultaneously, shortening the time to extract page information and improving the efficiency for extracting the page information.

After the obtaining module 301 and the extraction module 302 extract the target information from the source code of the webpage, because the target information might not be standard program code, a browser may be unable to directly load and display the page information corresponding to the target information based on extracted target information. Thus, the generating module 303 is configured to generate page information in a specified format based on the extracted target information.

That is, the generating module 303 is configured to generate corresponding page display code based on the extracted target information, and the page display code may be used by the browser to load and display the page information corresponding to the target information.

The page display code may be program code in the HTML language format. Thus, after the generating module 303 generates the page display code, the browser can load and display the page information corresponding to the target information based on the generated page display code.

In addition, referring to FIG. 3B, before the extraction module extracts the target information, the setting module 304 may be configured to obtain information of the user's mobile terminal. The mobile terminal information may include one or more parameters such as the model of the mobile terminal, and the screen size and resolution, etc., and the hardware processing capability of the mobile terminal. The setting module 304 may set in advance the filtering characteristic string and the tag matching mode based on the mobile terminal information.

The mobile terminal information may include the size and resolution of the display screen of the mobile terminal. Usually, different mobile terminals may have different page display capabilities, such as different screen sizes. When the screen size of a mobile terminal is small, it may appear crowded even when less page information is displayed. By setting the filtering characteristic string and the tag matching mode based on the mobile terminal information, the finally extracted target information may be more suitable for the user's mobile terminal, and can be more suitable for display on the display screen of the mobile terminal, improving user experience when browsing webpages.

Thus, according to the disclosed embodiments, the source code of the webpage is divided into code segments first. Then, based on the preset filtering characteristic strings and the preset tag matching mode, target information can be extracted from the source code in the code segments simultaneously. Based on the extracted target information, page information in specified format can be generated. Because the source code is segmented, and the target information is extracted from the code segments simultaneously based on the preset filtering characteristic strings and the preset tag matching mode, the time for extracting page information of the webpage can be reduced, the page information extraction efficiency can be increased, and the page information unsuitable for display on small screen mobile terminals can be filtered, avoiding the extraction of all contents of the to-be-processed webpages through the DOM tree. Thus, such disclosed methods may be applied to various types of mobile terminals for extracting and displaying the page information.

In some embodiments, any suitable non-transitory computer readable media can be used for storing instructions for performing the disclosed methods. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), or any suitable tangible media.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for extracting page information, comprising:
    obtaining, by a processor, to-be-processed source code of a webpage and dividing the source code of the webpage into one or more code segments;
    while obtaining the source code of the webpage and dividing the source code of the webpage, simultaneously extracting without generating a DOM tree, by the processor, target information from each code segment of the one or more code segments of the source code;
    simultaneously extracting the one or more code segments of the source code to generate the page information, wherein extracting the target information from each code segment includes:
        performing a lexical analysis on each code segment and obtaining a plurality of pieces of tag information of each code segment;
        from the plurality of pieces of tag information of each code segment, deleting tag information matching a preset filtering characteristic string from each code segment of the source code; and
        according to a model, a screen size, a screen resolution, and a hardware processing capability of a mobile terminal, selecting and extracting, from undeleted tag information, tag information matching a preset tag matching mode as the target information of each code segment; and
    generating, by the processor, the page information in a specified format based on the extracted target information of each code segment of the one or more code segments.

2. The method according to claim 1, wherein deleting the tag information matching the preset filtering characteristic string further includes:
    reading an opening tag string of the tag information;
    determining whether the opening tag string contains the preset filtering characteristic string; and
    when it is determined that the opening tag string contains the preset filtering characteristic string, determining that the tag information matches the preset filtering characteristic string and deleting the tag information,
    wherein the deleted tag information is unsuitable for a screen of the mobile terminal and comprises video-type tag information, image-type tag information, sub-link type tag information, or a combination thereof.

3. The method according to claim 1, wherein:
    the preset tag matching mode is a single tag matching mode, and
    selecting and extracting, from the undeleted tag information, the tag information matching the preset tag matching mode as the target information further includes:
        sequentially tag matching all of the undeleted tag information with the single tag matching mode; and
        extracting tag information matching the single tag matching mode as the target information.

4. The method according to claim 1, wherein:
    the preset tag matching mode is a composite tag matching mode, and
    selecting and extracting, from the undeleted tag information, the tag information matching the preset tag matching mode as the target information further includes:
        sequentially tag matching all of the undeleted tag information with the composite tag matching mode; and
        extracting multiple pieces of tag information sequentially arranged and matching the composite tag matching mode as the target information.

5. The method according to claim 1, wherein:
    dividing the source code of the webpage into one or more code segments includes:
    based on a segmentation characteristic string, dividing the source code of the webpage into a plurality of code segments to obtain each code segment to be processed.

6. The method according to claim 1, wherein obtaining the to-be-processed source code of the webpage further includes:
    receiving a request from a user for the webpage and sending the webpage request to a corresponding web server; and
    receiving a source code of the webpage from the web server through streaming, the received source code being the to-be-processed source code of the webpage.

7. The method according to claim 1, wherein generating the page information in the specified format based on the extracted target information of each code segment of the one or more code segments further includes:
    based on the extracted target information of each code segment of the one or more code segments, generating corresponding page display code to be used by a browser to load and display the page information of the target information.

8. A mobile terminal, comprising:
a memory, and
a processor coupled to the memory and configured to:
obtain to-be-processed source code of a webpage and divide the source code of the webpage into one or more code segments;
while obtaining the source code of the webpage and dividing the source code of the webpage, simultaneously extract without generating a DOM tree, target information from each code segment of the one or more code segments of the source code;
simultaneously extracting the one or more code segments of the source code to generate the page information, wherein extracting the target information from each code segment includes:
  performing a lexical analysis on each code segment and obtaining a plurality of pieces of tag information of each code segment;
  from the plurality of pieces of tag information of each code segment, deleting tag information matching a preset filtering characteristic string from each code segment of the source code; and
  according to a model, a screen size, a screen resolution, and a hardware processing capability of a mobile terminal, selecting and extracting, from undeleted tag information, tag information matching a preset tag matching mode as the target information of each code segment; and
generate the page information in a specified format based on the extracted target information of each code segment of the one or more code segments.

9. The mobile terminal according to claim 8, wherein the processor is further configured to:
read an opening tag string of a tag information;
determine whether the opening tag string contains the preset filtering characteristic string; and
when it is determined that the opening tag string contains the preset filtering characteristic string, determine that the tag information matches the preset filtering characteristic string and to delete the tag information,
wherein the deleted tag information is unsuitable for a screen of the mobile terminal and comprises video-type tag information, image-type tag information, sub-link type tag information, or a combination thereof.

10. The mobile terminal according to claim 8, wherein the preset tag matching mode is a single tag matching mode, and the processor is further configured to:
sequentially tag match all of the undeleted tag information with the single tag matching mode; and
extract tag information matching the single tag matching mode as the target information.

11. The mobile terminal according to claim 8, wherein the preset tag matching mode is a composite tag matching mode, and the processor is further configured to:
sequentially tag match all of the undeleted tag information with the composite tag matching mode; and
extract multiple pieces of tag information sequentially arranged and matching the composite tag matching mode as the target information.

12. The mobile terminal according to claim 8, wherein the processor is further configured to:
based on a segmentation characteristic string, divide the source code of the webpage into a plurality of code segments to obtain each code segment to be processed.

13. The mobile terminal according to claim 8, wherein the processor is further configured to:
receive a request from a user for the webpage and send the webpage request to a corresponding web server; and
receive a source code of the webpage from the web server through streaming, the received source code being the to-be-processed source code of the webpage.

14. The mobile terminal according to claim 8, wherein the processor is further configured to, based on the extracted target information of each code segment of the one or more code segments, generate corresponding page display code to be used by a browser to load and display the page information of the target information.

15. A non-transitory computer readable memory comprising a computer readable program stored thereon, wherein, when being executed, the computer readable program causes a computer to implement a method for extracting page information, the method comprising:
obtaining to-be-processed source code of a webpage and dividing the source code of the webpage into one or more code segments;
while obtaining the source code of the webpage and dividing the source code of the webpage, simultaneously extracting without generating a DOM tree, target information from each code segment of the one or more code segments of the source code;
simultaneously extracting the one or more code segments of the source code to generate the page information, wherein extracting the target information from each code segment includes:
  performing a lexical analysis on each code segment and obtaining a plurality of pieces of tag information of each code segment;
  from the plurality of pieces of tag information of each code segment, deleting tag information matching a preset filtering characteristic string from each code segment of the source code; and
  according to a model, a screen size, a screen resolution, and a hardware processing capability of a mobile terminal, selecting and extracting, from undeleted tag information, tag information matching a preset tag matching mode as the target information of each code segment; and
generating the page information in a specified format based on the extracted target information of each code segment of the one or more code segments.

16. The non-transitory computer readable memory of claim 15, wherein deleting the tag information matching the preset filtering characteristic string further includes:
reading an opening tag string of the tag information;
determining whether the opening tag string contains the preset filtering characteristic string; and
when it is determined that the opening tag string contains the preset filtering characteristic string, determining that the tag information matches the preset filtering characteristic string and deleting the tag information,
wherein the deleted tag information is unsuitable for a screen of the mobile terminal and comprises video-type tag information, image-type tag information, sub-link type tag information, or a combination thereof.

17. The non-transitory computer readable memory of claim 15, wherein the preset tag matching mode is a single tag matching mode, and selecting and extracting, from the undeleted tag information, the tag information matching the preset tag matching mode as the target information further includes:

sequentially tag matching all of the undeleted tag information with the single tag matching mode; and extracting the tag information matching the single tag matching mode as the target information.

18. The non-transitory computer readable memory of claim 15, wherein the preset tag matching mode is a composite tag matching mode, and selecting and extracting, from the undeleted tag information, the tag information matching the preset tag matching mode as the target information further includes:

sequentially tag matching all of the undeleted tag information with the composite tag matching mode; and extracting multiple pieces of tag information sequentially arranged and matching the composite tag matching mode as the target information.

19. The non-transitory computer readable memory of claim 15, wherein:

dividing the source code of the webpage into one or more code segments includes:

based on a segmentation characteristic string, dividing the source code of the webpage into a plurality of code segments to obtain each code segment to be processed.

20. The non-transitory computer readable memory of claim 15, wherein obtaining the to-be-processed source code of the webpage further includes:

receiving a request from a user for the webpage and sending the webpage request to a corresponding web server; and receiving a source code of the webpage from the web server through streaming, the received source code being the to-be-processed source code of the webpage.

21. The non-transitory computer readable memory of claim 15, wherein generating page information in a specified format based on the extracted target information of each code segment of the one or more code segments further includes:

based on the extracted target information of each code segment of the one or more code segments, generating corresponding page display code to be used by a browser to load and display the page information of the target information.

* * * * *